3,080,227
Patented Mar. 5, 1963

3,080,227
REMOVAL OF CADMIUM FROM ZINC
Stephen Esslemont Woods and Thomas Ronald Albert Davey, Avonmouth, Bristol, England, assignors to Metallurgical Processes Limited, Nassau, Bahamas, a corporation of Bahamas and The National Smelting Company, London, England, a British company, carrying on business under name of Metallurgical Development Company, Nassau, Bahamas
Filed Oct. 14, 1959, Ser. No. 846,395
Claims priority, application Great Britain Oct. 16, 1958
4 Claims. (Cl. 75—63)

This invention relates to the removal of cadmium from zinc.

The invention consists of a process for the cadmium enrichment of zinc in which zinc vapour containing also cadmium vapour is cooled under vacuum so as to effect partial condensation, whereby the uncondensed vapour becomes enriched in cadmium, and the condensed cadmium-containing zinc is partially re-evaporated, whereby cadmium is preferentially evaporated and the uncondensed vapours enriched in cadmium are separately condensed.

Preferably the zinc vapour is first condensed on a cooled solid body of zinc, liquid zinc dripping off is collected in a heated zone and part of the cadmium enriched vapours re-evaporated from the zone is recondensed on a solid body of cadmium-zinc alloy to increase further the cadmium content of the uncondensed re-evaporated vapours.

One application of the invention is to obtain zinc of low cadmium content from a stream of molten lead that is circulated through a condenser to condense zinc vapour from the gases produced from a zinc-smelting blast furnace.

Cadmium commonly occurs in small amounts in zinc ores. Any cadmium charged to the zinc-smelting blast furnace is reduced and volatilized along with the zinc and hence cadmium becomes dissolved in the molten lead in the condenser.

The blast furnace gases contain, besides zinc vapour, a considerable amount of non-condensable gases, chiefly nitrogen, carbon monoxide and carbon dioxide. As these pass through the condenser, the molten lead rises in temperature, the sensible heat it absorbs corresponding not only to the latent heat of condensation of the zinc vapour to form a solution in lead, but, in addition, to the sensible heat lost by the inert gases as they are cooled by the lead. The heat lost by radiation and convection from the condenser is relatively small. The amount of heat that has to be abstracted from the lead before returning it to the condenser is, therefore, greater than the heat required to evaporate the zinc that has been absorbed in the condenser.

Conveniently, therefore, the heat required for the re-evaporation is supplied by the sensible heat of the molten lead.

The zinc vapour may be obtained from the lead which comes from the condenser in a manner known per se by evaporation under vacuum from an extended surface of the molten lead.

The invention further consists of apparatus for carrying out the process of the invention.

The invention will be further described with reference to the accompanying drawings.

Figure 1:
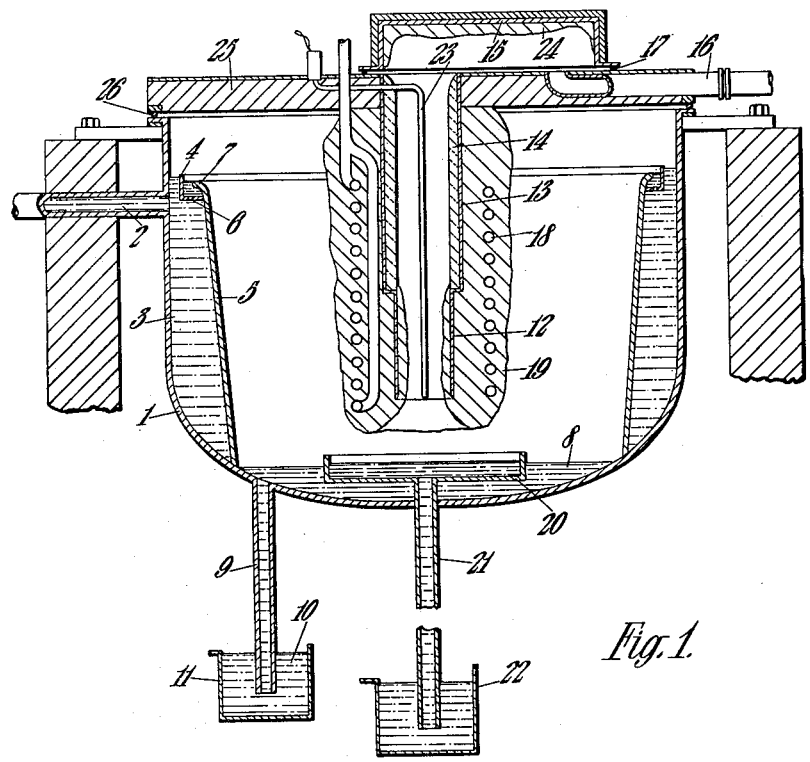
FIGURE 1 is a vertical section of an apparatus for carrying out the process of the invention.

In the drawings lead that has been circulated through a condenser, to which are passed the gases from a zinc-smelting blast furnace, is supplied at a temperature of about 560° C. to 620° C., to the chamber 1 through a pipe 2 situated just below the surface of the molten lead in the annular well 3. The lead in this well builds up behind a right-angled flange 4 welded to the top of the spreading tube 5. This flange has holes 6 through which lead seeps evenly around the perimeter of the spreading tube 5.

This tube has an outwardly divergent lip 7 over which the lead flows as a thin film covering the inside of the wall 5. As the low pressure prevailing in the chamber, some of the zinc and cadmium in this lead progressively evaporates as the lead flows down the wall 5. This lead forms a pool 8 in the bottom of the chamber at one side of which a pipe 9 connects down to a bath of lead 10 in the pot 11, from which it flows continuously and is returned to the condenser.

The vertical condenser tube 12 constructed of a suitable heat-conducting material such as cast iron, has an upper extension 13 which is provided with a heat-insulating lining 14, and which is suspended from a removable lid 15. This is connected to the vacuum line 16 which is hermetically sealed to the vacuum chamber by a lid 25. The connection to the vacuum line 16 is arranged to pass through this lid 25 which is hermetically sealed to the vacuum chamber by an interposed compressible sealing ring 26. A similar ring 17 seals the removable cold trap 15 to the vacuum chamber.

A coil 18 through which cooling water is circulated encircles the condenser tube. When the apparatus is initially operated, the zinc and cadmium that are evaporated from the molten zinciferous lead as it passes over the inner surface of the spreading tube 5 are condensed in the solid condition on the exterior of the condenser tube 12 at its upper extension 13 and also around the cooling coil 18. This deposit of solid zinc progressively builds up as the operation continues until a steady state is reached when a solid zinc collar 19 is built up around the condenser tube and cooling coils and further condensed zinc drips off as liquid metal to be caught in the tray 20 which is connected by pipe 21 to a pool of molten zinc contained in pot 22.

The level of zinc in pot 22 is kept at a distance slightly greater than a barometric head of zinc below the rim of tray 20 which is constructed of a material of good thermal conductivity, so that molten zinc is kept in the tray 20 but does not overflow therefrom. The level of the lead 10 in pot 11 is similarly maintained at a distance slightly greater than a barometric head of lead below the rim of tray 20, so that it surrounds the lower part of this tray, but does not overflow thereinto.

Axially situated inside the condenser is a radiant heater 23 to prevent blockage of the condenser tube 13 by solidified zinc.

The lead enters the condenser at a temperature which is generally in the range of 560° C. to 620° C. The zinc content of this lead may be in the range from about 0.8% to 2.5%. As a typical case, the lead enters at 560° C. and contains 1.0% zinc. As the lead flows down the distributor plate 5, 0.25% zinc evaporates so that the lead that accumulates in the pool 8 contains 0.75% zinc. The evaporated zinc mostly condenses on the outside of the collar 19, such portion as remains uncondensed when it enters the condenser being enriched in cadmium. The further condensation takes place on the inside of the condenser adjacent to the non-insulated portion 12 and the zinc vapour escaping from here is still further enriched in cadmium.

The zinc condensed on the collar 19, having been formed in contact with solid zinc, is necessarily at the melting point of zinc, 420° C. It falls into the tray 20 where it becomes heated by the molten lead in the pool 8, so that some of the zinc evaporates. The evaporation of 0.25% zinc from the lead as it passes down the spreading plate 5 absorbs sufficient heat to cool the lead by 40° C. from 560° C. The lead in the pool 8 can cool down to 480° C. and still be able to supply heat to the zinc inside tray 20, since at the pressures prevailing zinc can still evaporate even when the temperature of the zinc is 450° C. There is, therefore, sufficient sensible heat in the lead to enable a considerable amount of zinc to be re-evaporated in tray 20. This re-evaporated zinc is considerably richer in cadmium than the liquid zinc from which it is derived. Further, when this re-evaporated zinc vapour is mostly re-condensed on collar 19, particularly on the inside of the condenser 12, the uncondensed portion becomes further enriched in cadmium. It is therefore possible to allow a small portion of the zinc vapour, highly enriched in cadmium, to escape through the upper insulated part 13 of the condenser and condense this as a solid deposit 24 in the cold trap 15.

Figure 2:
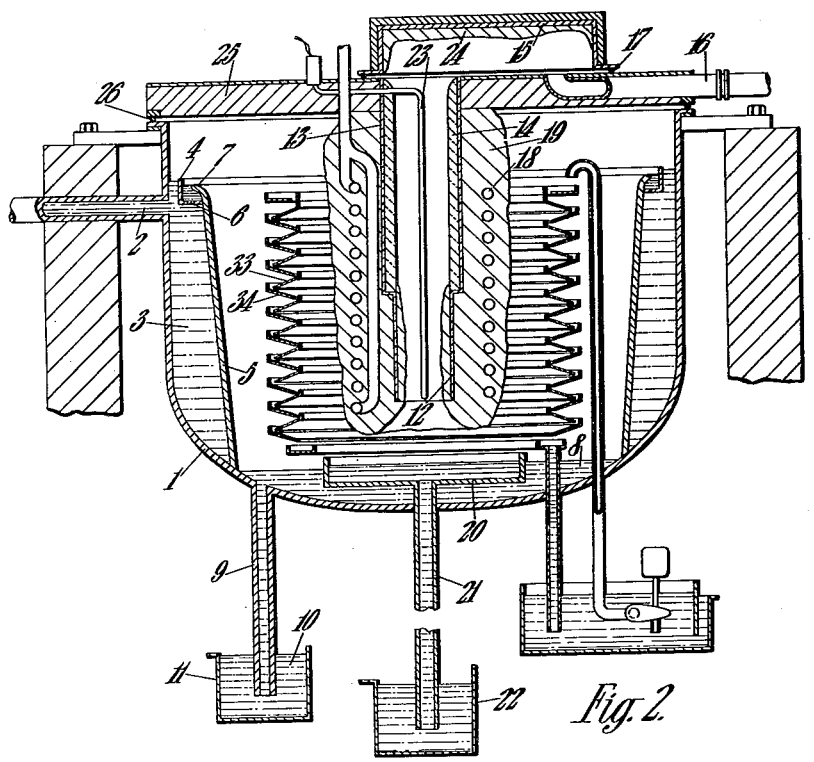
FIGURE 2 is a similar view of a modified form of apparatus.

The process according to the invention may also be used in conjunction with the apparatus having an additional zinc-refluxing stage consisting of a series of inclined annular shelves, over which flows molten zinc. The combined apparatus is shown in FIGURE 2. The zinc which is evaporated from the spreading tube 5 condenses into the molten zinc flowing over the outwardly inclined trays 33 and re-evaporates from the zinc flowing over the inwardly inclined trays 34. The process then continues as described above.

In the condensation of zinc on the collar 19, any zinc vapour remaining uncondensed is relatively richer in cadmium than the condensed zinc. In order to ensure that a good enrichment of cadmium is attained, the tray 20 is so positioned in relation to the lower end of the collar 19 that there is a relatively small gap between the bottom of the collar 19 and the liquid zinc in tray 20 in order to promote as far as possible an equilibruim distribution of cadmium between liquid and vapour. This ensures that the zinc vapour entering the bottom of the condenser contains a high concentration of cadmium relatively to the condensed zinc. In order to promote further cadmium enrichment of the last portion of zinc vapour condensed, the lower portion 12 of the metal condenser is not insulated on the inside, so that further condensation of zinc vapour takes place here, with refluxing, so that the zinc vapour leaving this portion of the condenser becomes further enriched in cadmium. The upper part of the condenser has an insulated lining 14 on the inside.

The cadmium-enriched zinc vapour passes up to a water-cooled trap 15 (FIGURES 1 and 2) where it condenses and forms a solid deposit 24 in the cold trap. This trap is easily removed to collect the cadmium-enriched zinc, which may be of the order of 1% of the total zinc collected and yet contain about 90% of the total cadmium. Thus, for instance, if the total input cadmium is 0.1% of the zinc, the 99% of zinc collected from the pot 22 might contain 0.01% cadmium, while the 1% of the zinc collected in the cold trap 15 might contain 9% cadmium.

Figure 3:
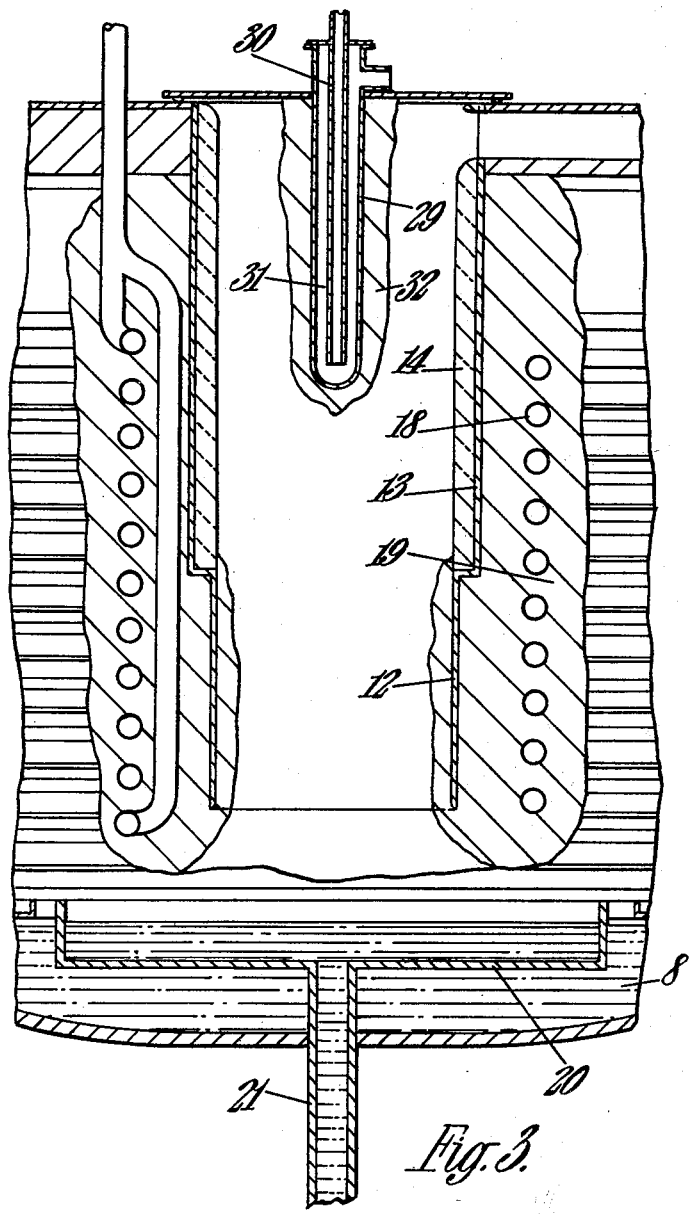
FIGURE 3 is a detail of FIGURE 2 showing a further modification.

An alternative and equally efficient method of collecting the final deposit of cadmium-enriched zinc is to use a bayonet-type cooler 29 as shown in FIGURE 3, in which water flows into the cooler by pipe 30 and flows out around the pipe 30 in the annular region 31. The last portion of the zinc vapour condenses as a solid layer 32 on the outside of the cooler 29.

Various other modifications may be made within the scope of the invention.

We claim:
1. A process for separating and recovering zinc and cadmium from molten lead containing a recoverable amount of zinc together with some cadmium as an impurity, comprising subjecting the said lead to vacuum distillation to distill therefrom cadmium-containing zinc vapor, condensing a portion of the cadmium-containing zinc vapor on a cool solid body of zinc, whereby the uncondensed zinc vapor becomes enriched in cadmium, collecting the condensed molten zinc running off said solid body of zinc to form a body of molten zinc containing a minor amount of cadmium, heat being supplied to said cadmium-containing body of molten zinc by direct conduction from a body of the molten lead from which zinc and cadmium have been distilled, whereby cadmium-rich zinc vapor is re-distilled from said body of molten zinc, condensing a portion of said cadmium-rich zinc vapor on the surface of a cooled solid body of zinc, whereby the uncondensed vapor becomes further enriched in cadmium, and condensing the thus further enriched zinc vapor to recover solid cadmium-rich zinc metal, all of said distillation and condensation steps being conducted under a vacuum.

2. The process according to claim 1 in which the zinc- and cadmium-containing molten lead has an initial temperature such that the reduction in its temperature occasioned by the distillation of cadmium-containing zinc vapor therefrom and the further reduction in its temperature occasioned by the redistillation of cadmium-containing vapor from the body of molten zinc still leaves the lead at a temperature substantially above the melting point of zinc.

3. The process according to claim 2 in which the cadmium- and zinc-containing lead has an initial temperature within the range of about 560° C. to 620° C., and in which the molten lead has a final temperature of at least about 480° C.

4. Apparatus for the separation and recovery of zinc and cadmium from molten lead containing a recoverable amount of zinc together with some cadmium as an impurity, comprising an evacuated vessel having an annular part adapted to be bathed by said molten lead at a temperature at which said zinc and cadmium are distilled, collecting means for establishing and maintaining in the bottom of the vessel a body of said molten lead from which the zinc and cadmium have been at least partially distilled, an inner annular part mounted within the vessel, the inner annular part being provided with cooling means adapted to cool and condense thereon zinc and cadmium distilled from the lead, a tray disposed below the cooling means, supporting means for suspending the tray above the bottom of the evacuated vessel and in the body of molten lead in the bottom of the vessel, there being no obstruction between the annular part and the bottom of said tray whereby molten zinc and cadmium dripping from the cooling means into the tray are heated and redistilled by the heat of said body of molten lead in which the tray is suspended, and means for collecting said redistilled zinc and cadmium vapors evolved from the tray.

References Cited in the file of this patent
UNITED STATES PATENTS

| | | |
|---|---|---|
| 2,348,194 | Crane et al. | May 9, 1944 |
| 2,720,456 | Davey | Oct. 11, 1955 |
| 2,823,111 | Davey et al. | Feb. 11, 1958 |
| 3,031,296 | Davey | Apr. 24, 1962 |

OTHER REFERENCES

Handbook of Chemistry and Physics, 41st ed., Chemical Rubber Publishing Co., 1959, page 2333.